US012598234B2

(12) United States Patent

Stapleton et al.

(10) Patent No.: US 12,598,234 B2

(45) Date of Patent: Apr. 7, 2026

(54) DRONE ELECTRONIC MESH FOR ONLINE NETWORK SERVICES (DEMONS) IMPLEMENTING CRYPTOGRAPHIC OPERATIONS

(71) Applicant: Wells Fargo Bank, N.A., San Francisco, CA (US)

(72) Inventors: Jeffrey J. Stapleton, O'Fallon, MO (US); Peter Bordow, Fountain Hills, AZ (US)

(73) Assignee: Wells Fargo Bank, N.A., San Francisco, CA (US)

( * ) Notice: Subject to any disclaimer, the term of this patent is extended or adjusted under 35 U.S.C. 154(b) by 108 days.

(21) Appl. No.: 18/527,163

(22) Filed: Dec. 1, 2023

(65) Prior Publication Data

US 2025/0184394 A1 Jun. 5, 2025

(51) Int. Cl.
| | |
|---|---|
| *H04L 67/12* | (2022.01) |
| *H04L 9/08* | (2006.01) |
| *H04L 9/32* | (2006.01) |

(52) U.S. Cl.
CPC ............ *H04L 67/12* (2013.01); *H04L 9/0819* (2013.01); *H04L 9/3263* (2013.01); *H04L 2209/84* (2013.01)

(58) Field of Classification Search
CPC ..... H04L 67/12; H04L 9/0819; H04L 9/3263; H04L 2209/84

USPC .......................................................... 713/150
See application file for complete search history.

(56) References Cited

U.S. PATENT DOCUMENTS

| | | | |
|---|---|---|---|
| 11,469,889 B1 * | 10/2022 | Balmakhtar | .......... H04L 9/0852 |
| 2017/0250805 A1 * | 8/2017 | Kwiat | ................... H04L 9/0822 |
| 2025/0015980 A1 * | 1/2025 | Stapleton | .............. H04L 9/0822 |

FOREIGN PATENT DOCUMENTS

CA         3060191 A1 *  5/2020  .......... H04W 12/069

* cited by examiner

*Primary Examiner* — Bryan F Wright
(74) *Attorney, Agent, or Firm* — Foley & Lardner LLP

(57) ABSTRACT

The arrangements disclosed herein relate to systems, apparatus, methods, and non-transitory computer readable media for a network of plurality of roving cryptography devices. Each of the plurality of roving cryptography devices includes a locomotion system configured to move each of the plurality of roving cryptography devices to a respective one of a plurality of locations of the plurality of roving cryptography devices, a network interface circuit configured to provide wireless communication services to a user device of a plurality of user devices through a network of the plurality of roving cryptography devices, and a cryptography service system configured to provide cryptographic material to the user device. The plurality of roving cryptography devices at the plurality of locations form the network for providing the wireless communication services and the cryptographic materials to the plurality of user devices.

18 Claims, 3 Drawing Sheets

DRONE ELECTRONIC MESH FOR ONLINE NETWORK SERVICES (DEMONS) IMPLEMENTING CRYPTOGRAPHIC OPERATIONS

BACKGROUND

Modern electronic devices use encryption to protect communications between devices and sensitive data stored on devices. Unpredictable adverse events such as natural disasters, power outages, war, and so on can interrupt not only communication services but also cryptographic services for electronic devices. For example, an adverse event that interrupts power supply for a region can interrupt not only wireless communication networks, but also cryptographic devices such as conventional automated teller machines (ATMs) and hardware security modules (HSMs), which also require power to operate. In addition, certain regions such as oil rigs, remote scientific research sites such as the McMurdo Station in the Antarctic (or others in the dessert, the ocean, etc.), and so on have infrastructure challenges to support communication services and cryptographic services. Without cryptographic services, electronic devices cannot perform cryptographic operations such as encryption, decryption, electronic signatures, signcrypt, authentication, verification, and so on. Not only do communications and sensitive data become unsecured without cryptographic services, some applications or software that require cryptographic services to run can become entirely unavailable. This can render affected users unable to access certain applications or functionalities, such as paying for sustenance with mobile wallet or mobile banking applications.

SUMMARY

The arrangements disclosed herein relate to systems, methods, non-transitory computer-readable media, and apparatuses for a network of plurality of roving cryptography devices. Each of the plurality of roving cryptography devices includes a locomotion system configured to move each of the plurality of roving cryptography devices to a respective one of a plurality of locations of the plurality of roving cryptography devices, a network interface circuit configured to provide wireless communication services to a user device of a plurality of user devices through a network of the plurality of roving cryptography devices, and a cryptography service system configured to provide cryptographic material to the user device. The plurality of roving cryptography devices at the plurality of locations form the network for providing the wireless communication services and the cryptographic materials to the plurality of user devices.

The arrangements disclosed herein relate to systems, methods, non-transitory computer-readable media, and apparatuses for a roving cryptography device including a locomotion system configured to move the roving cryptography device to a locations, a network interface circuit configured to provide wireless communication services to a user device through a network of a plurality of roving cryptography devices that includes the roving cryptography devices, and a cryptography service system configured to provide cryptographic material to the user device. The user device uses the cryptographic material to perform at least one of encrypting data, decrypting data, encrypting another cryptographic material, decrypting another cryptographic material, signing data, verifying data, or signcrypting data. At least one of the encrypted data, the data to be encrypted, the decrypted data, the data to be decrypted, the encrypted another cryptographic material, the another cryptographic material to be encrypted, the decrypted another cryptographic material, the another cryptographic material to be decrypted, the signed data, the data to be signed, the verified data, or the data to be verified is sent or received by the network interface circuit using the wireless communication services.

The arrangements disclosed herein relate to systems, methods, non-transitory computer-readable media, and apparatuses for determining a plurality of locations for a plurality of roving cryptography devices, each of the plurality of roving cryptography devices includes a locomotion system configured to move each of the plurality of roving cryptography devices to a respective one of the plurality of locations of the plurality of roving cryptography devices, a network interface circuit configured to provide wireless communication services to a user device of a plurality of user devices through a network, and a cryptography service system configured to provide cryptographic material to the user device. The plurality of roving cryptography devices at the plurality of locations form the network provide the wireless communication services and the cryptographic materials to the plurality of user devices. The plurality of locations are sent to the plurality of roving cryptography devices.

These and other features, together with the organization and manner of operation thereof, will become apparent from the following detailed description when taken in conjunction with the accompanying drawings.

DETAILED DESCRIPTION

The arrangements of the present disclosure relate to systems, apparatuses, methods, and non-transitory computer-readable media for roving systems such as Drone Electronic Mesh for Online Network Services (DEMONS) to support encrypted communications between a host device and remote devices (e.g., first responder devices) that are otherwise unreachable by conventional communication networks and conventional key loading devices. Such a roving system includes a network of roving cryptography devices configured be deployed in (e.g., to move to) areas in which cryptographic services are not available (e.g., key storage, key distribution, key loading, and so on) to remote devices. In some examples, the network of roving cryptography devices can provide wireless communication services (e.g., the Internet, cellular services, WiFi services and non-radio frequency communications such as infrared, ultraviolet, lasers, and so on) to remote devices in addition to cryptographic services. In other words, a roving cryptography device can include a combination of a communication node and cryptographic hardware, to support both the communication protocol and the cryptographic protocols in communications between two user devices.

Figure 1:
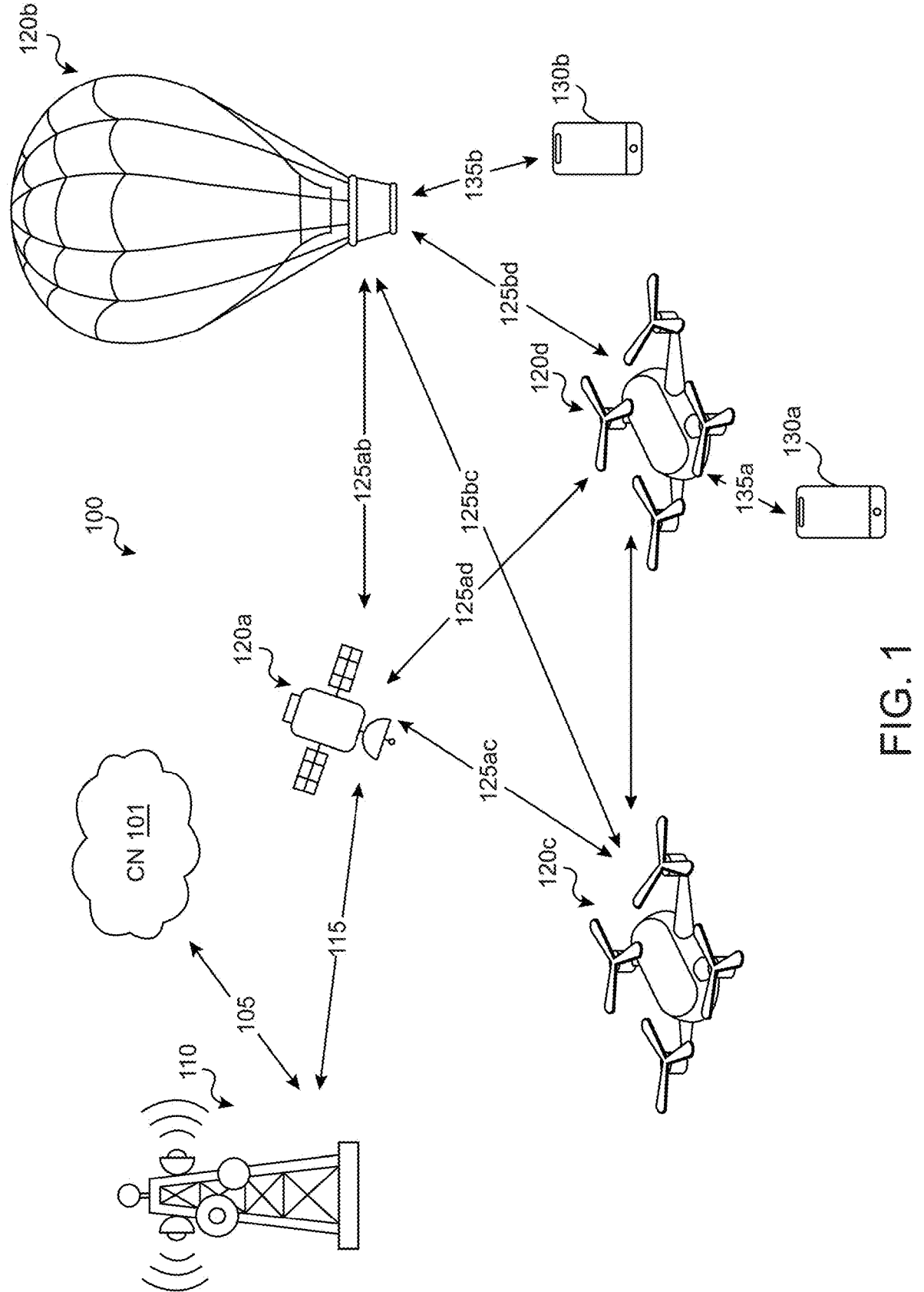
FIG. 1 is a roving system for providing mobile communication services and mobile cryptographic services for user devices, according to various arrangements.

FIG. 1 is a roving system 100 for providing mobile communication services and mobile cryptographic services for user devices 130a and 130b, according to various arrangements. The roving system 100 includes various communication nodes or network nodes including a base station 110, a Core Network (CN) 101, the roving cryptography devices 120a, 120b, 120c, and 120d, and user devices 130a and 130b.

The roving system 100 includes the base station 110 that is communicably coupled to the CN 101, via a suitable interface such as an Iu interface over a physical or wireless communication link 105. Data can be sent to and received from other communication nodes (e.g., other base stations, user devices, roving cryptography devices, and so on) external to the roving system 100 via the CN 101. Examples of the base station 110 include an Evolved Node B (eNB), a next Generation Node B (gNB), a Transmission/Reception Point (TRP), an Access Point (AP), a Reconfigurable Intelligent Surface (RIS), and so on.

The roving system 100 includes a network of the roving cryptography devices 120a, 120b, 120c, and 120d. Each of the roving cryptography devices 120a, 120b, 120c, and 120d has capabilities for locomotion, wireless communication services, and cryptographic services. Each of the roving cryptography devices 120a, 120b, 120c, and 120d can include a drone, an Unmanned Ariel Vehicle (UAV), an Unmanned Ground Vehicle (UGV), an Unmanned Maritime Vehicle (UMV), airplanes, gliders, a satellite (e.g., a Lower Earth Orbit (LEO) satellite, a Geosynchronous Equatorial Orbit (GEO) satellite, a Medium Earth Orbit (MEO), and so on), a High Altitude Platform System (HAPS), and so on. For example, as shown in FIG. 1, the roving cryptography device 120a includes a satellite, the roving cryptography device 120b some a HAPS (e.g., a balloon), the roving cryptography devices 120c and 120d include UAVs. In some examples, the roving cryptography devices of a same roving system can include different types of roving cryptography devices (e.g., two or more of drones, UAVs, UGVs, UMV, airplanes, gliders, satellites, HAPS, and so on). In other examples, the roving cryptography devices of a same roving system can include a same type of roving cryptography devices (e.g., all roving cryptography devices are drones). In the examples in which the roving system 100 includes one or more drones, UAVs, UGVs, UMVs, airplanes, or gliders, the roving system 100 can be referred to as DEMONS.

Similar to the base station 110, each of the roving cryptography devices 120a, 120b, 120c, and 120d can provide wireless communication services within an area (referred to as a cell) commensurate with the range of the wireless communication capabilities of that roving cryptography device as well as that of the user device in communication with the roving cryptography device. For example, a user device within a cell of a roving cryptography device can be connected and registered to that roving cryptography device via suitable random access procedures and can send data to and receive data from the roving cryptography device. For example, the user device 130a is within a cell of the roving cryptography device 120d and is coupled to the roving cryptography device 120d via a communication link 135a for wireless communication services and cryptographic services. For example, the user device 130b is within a cell of the roving cryptography device 120b and is coupled to (e.g., registered to, camped on, etc. via suitable random access procedures) the roving cryptography device 120b via a communication link 135b for wireless communication services and cryptographic services. The roving cryptography devices 120a, 120b, 120c, and 120d can provide the wireless communication services and cryptographic services to additional user devices (not shown) in respective cells.

At least one of the roving cryptography devices 120a, 120b, 120c, and 120d, such as the roving cryptography device 120a, can be operatively coupled to the CN 101 via the base station 110, and can send data to and receive data from the CN 101 via the base station 110. For example, the roving cryptography device 120a is communicable coupled to the base station 110 via a communication link 115. In other examples, one or more of the roving cryptography devices 120a, 120b, 120c, and 120d can connect directly to the CN 101, without requiring the base station 110.

The roving cryptography devices 120a, 120b, 120c, and 120d can be deployed to form a network or mesh to provide wireless communication services and cryptographic services to user devices, such as the user devices 130a and 130b. As shown, the roving cryptography devices 120a, 120b, 120c, and 120d are connected to each other via the communication links 125ab, 125ac, 125ad, 125bc, 125bd, and 125cd, which can be over cellular standards, WiFi standards, satellite communication standards, and non-radio frequency communications such as infrared, ultraviolet, lasers, or a combination thereof. This allows data to be communicated and relayed through the roving system 100 to reach the CN 101 or to reach other communication nodes in the roving system 100. In some examples, the roving system 100 includes a combination of different types of roving cryptography devices 120a, 120b, 120c, and 120d. For example, the roving system 100 can include satellites at a higher altitudes, HAPS, planes, gliders at medium altitudes, and drones, UAVs, UGVs, and UMVs at lower altitudes.

For example, to send data from a user device (e.g., the user device 130a) in the roving system 100 to the CN 101 to be transmitted to a target user device (not shown) connected to the CN 101, the user device 130a transmits the data via the communication link 135a to the roving cryptography device 120d, which relays or forwards the data via the communication link 125ad to another roving cryptography device such as the roving cryptography device 120a, which relays or forwards the data via the communication link 115 to the base station 110, which relays or forwards the data via the communication link 105 to the CN 101. The CN 101 can provide the data to the target user device via one or more base stations or other roving cryptography devices. For example, for a user device (e.g., the user device 130a) in the roving system 100 to receive data from a source user device (not shown) connected to the CN 101, the CN 101 can receive the data from the source user device via one or more base stations or other roving cryptography devices (not shown) connected to the CN 101. The CN 101 can relay or forward the data via the communication link 105 to the base station 110, which relays or forwards the data via the communication link 115 to the roving cryptography device 120a, which relays or forwards the data via the communication link 125ad to the roving cryptography device 120d, which relays or forwards the data via the communication link 135a to the user device 130a. In some examples, the target device and the source device can be referred to as a host device, and the user device 130a can be referred to as a remote device.

In such examples, the communication nodes 120a and 110 can be characterized as intermediate nodes or hops between the CN 101 and the communication node 120d on which the user device 130*a* is registered. The number of communication nodes may vary in a communication path between the user device 130*a* and the CN 101, depending on the locations and arrangements of the roving cryptography devices 120*a*, 120*b*, 120*c*, and 120*d* and the location of the user device 130*a*. That is, the greater the distance between the base station 110 and the user device 130*a*, the more intermediate nodes are needed to relay data to and from the user device 130*a*, due to the finite range of each communication node. In other examples, there may not be any intermediate nodes between the communication node 120*d* and the CN 101, e.g., in the case that the communication node 120*d* is directly connected to the CN 101.

In some arrangements, data can be communicated without being routed through the CN 101. For example, to send data from a first user device (e.g., the user device 130*a*) in the roving system 100 to a second device (e.g., the user device 130*b*) in the roving system 100, the user device 130*a* transmits the data via the communication link 135*a* to the roving cryptography device 120*d*, which relays or forwards the data via the communication link 125*bd* to another roving cryptography device such as the roving cryptography device 120*b*, which relays or forwards the data via the communication link 135*b* to the user device 130*b*. Although no intermediate nodes are present in this example, the number of communication nodes may vary in a communication path between the user devices 130*a* and 130*b*, depending on the locations and arrangements of the roving cryptography devices 120*a*, 120*b*, 120*c*, and 120*d* and the locations of the user devices 130*a* and 130*b*. That is, the greater the distance between the user devices 130*a* and 130*b*, the more intermediate nodes are needed to relay data to and from the user device 130*a*, due to the limited range of each communication node (e.g., each roving cryptography device).

The base station 110 can have a fixed location, and the roving cryptography devices 120*a*, 120*b*, 120*c*, and 120*d* can be deployed to a region based on a predetermined schedule or in response to an adverse event, to form a communication network such that any user device within a cell of one of the roving cryptography devices 120*a*, 120*b*, 120*c*, and 120*d* can communicate with the CN 101 or another user device within a cell of another one of the roving cryptography devices 120*a*, 120*b*, 120*c*, and 120*d* via a communication path that includes at least one of the roving cryptography devices 120*a*, 120*b*, 120*c*, and 120*d*.

In addition to wireless communication capabilities, the roving cryptography devices 120*a*, 120*b*, 120*c*, and 120*d* can also provide cryptographic materials to the user devices 130*a* and 130*b*. In some examples, a cryptographic material as used herein refers to any tangible information that can be used in cryptographic operations (e.g., cryptographic processes or cryptographic algorithms) to encrypt, decrypt, sign, signcrypt, validate, authenticate, or protect sensitive information. Examples of the cryptographic material include a cryptographic key (e.g., a private key, a public key, a symmetric key, an asymmetric key, a secret key, a key encryption key, and so on), information (e.g., a secret parameter, a random number, a seed, a key component, an initialization vector, a salt, and so on) used to generate or derive a cryptographic key, authentication code, certificate, and so on. Each roving cryptography device includes suitable hardware to provide the cryptographic materials to a user device, as described in further details herein.

Each of the communication links 115, 125*ab*, 125*ad*, 125*bc*, 125*bd*, 125*cd*, 135*a*, and 135*b* can be a wireless communication link such as any suitable Local Area Network (LAN), Wide Area Network (WAN), satellite communication network, or a combination thereof. For example, each of the communication links 115, 125*ab*, 125*ac*, 125*ad*, 125*bc*, 125*bd*, 125*cd*, 135*a*, and 135*b* can be supported by Frequency Division Multiple Access (FDMA), Time Division Multiple Access (TDMA), Code Division Multiple Access (CDMA) (particularly, Evolution-Data Optimized (EVDO)), Universal Mobile Telecommunications Systems (UMTS) (particularly, Time Division Synchronous CDMA (TD-SCDMA or TDS) Wideband Code Division Multiple Access (WCDMA), Long Term Evolution (LTE), evolved Multimedia Broadcast Multicast Services (eMBMS), High-Speed Downlink Packet Access (HSDPA), and the like), Universal Terrestrial Radio Access (UTRA), Global System for Mobile Communications (GSM), Code Division Multiple Access 1× Radio Transmission Technology (1×), General Packet Radio Service (GPRS), Personal Communications Service (PCS), 802.11X, ZigBee, Bluetooth, Wi-Fi, a combination thereof, and/or the like. Each of the communication links 115, 125*ab*, 125*ac*, 125*ad*, 125*bc*, 125*bd*, 125*cd*, 135*a*, and 135*b* is structured to permit the exchange of data, values, parameters, signals, instructions, messages, and the like.

Communications via these links are secured using industry cryptographic protocols such as Transport Layer Security (TLS), Secure Shell Protocol (SSH), Internet Protocol Security (IPsec), including Post-Quantum Cryptography (PQC) algorithms with X.509 (single-key or dual-key) certificates, Pre-Shared Keys (PSK) methods, protocols that utilize Quantum Key Distribution (QKD) capabilities, and so on. Such cryptographic protocols require the user devices to use cryptographic materials to perform encrypt, decrypt, sign, signcrypt, validate, authenticate, or protect sensitive information and communications according to those cryptographic protocols. In the examples in which the cryptographic material includes cryptographic key, the user device can use the cryptographic key to directly perform encrypt, decrypt, sign, signcrypt, validate, authenticate, or protect sensitive information and communications. In the examples in which cryptographic material includes information used to generate or derive a cryptographic key, the user device can use the information to derive a cryptographic key to perform encrypt, decrypt, sign, signcrypt, validate, authenticate, or protect sensitive information and communications. Whether caused by unpredictable adverse events or due to being in a remote area (e.g., the McMurdo Station), the lack of fix-location cryptographic infrastructure may not be available for the user devices. Hence, the ad hoc or scheduled deployment of the dynamic system 100 can be implemented to provide cryptographic material along with communication capabilities.

Figure 2:
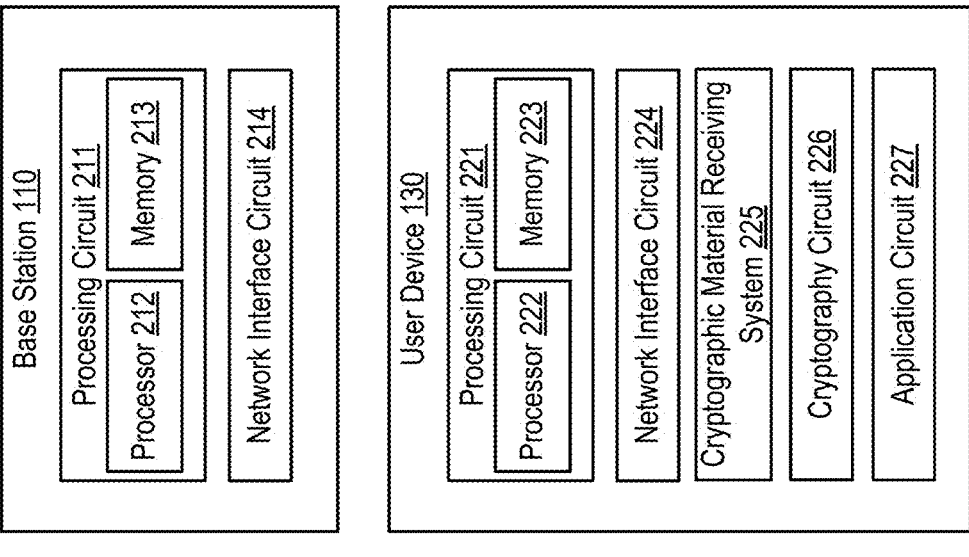
FIG. 2 illustrates block diagrams of an example base station, a roving cryptography device, and a user device, according to some arrangements.

FIG. 2 illustrates block diagrams of an example base station 110, a roving cryptography device 120, and a user device 130, according to some arrangements. The roving cryptography device 120 is an example of each of the roving cryptography devices 120*a*, 120*b*, 120*c*, and 120*d*. The user device 130 is an example of each of the user device 130*a* and 130*b*.

The roving cryptography device 120 can be a mobile, unmanned vehicle such as a drone, UAV, UGV, UMV, airplanes, gliders, satellite, HAPS, and so on. The roving cryptography device 120 is shown to include various circuits and logic for implementing the operations described herein. More particularly, the roving cryptography device 120 includes one or more of a processing circuit 201, a network interface circuit 204, a location motion system 205, and a cryptography service system 206. While various circuits, interfaces, and logic with particular functionality are shown, it should be understood that the roving cryptography device 120 includes any number of circuits, interfaces, and logic for facilitating the operations described herein. For example, the activities of multiple circuits are combined as a single circuit and implemented on a same processing circuit (e.g., the processing circuit 201), as additional circuits with additional functionality are included.

In some arrangements, the processing circuit 201 includes a processor 202 and a memory 203. The processor 202 is implemented as a general-purpose processor, an Application Specific Integrated Circuit (ASIC), one or more Field Programmable Gate Arrays (FPGAs), a Digital Signal Processor (DSP), a group of processing components, or other suitable electronic processing components. The memory 203 (e.g., Random Access Memory (RAM), Read-Only Memory (ROM), Non-Volatile RAM (NVRAM), flash memory, hard disk storage, etc.) stores data and/or computer code for facilitating the various processes described herein. Moreover, the memory 203 is or includes tangible, non-transient volatile memory or non-volatile memory. Accordingly, the memory 203 includes database components, object code components, script components, or any other type of information structure for supporting the various activities and information structures described herein. The processing circuit 201 can be used to implement or control one or more of the circuits or systems 204, 205, and 206.

The network interface circuit 204 is configured for and structured to establish and implement one or more of the communication links 115, 125ab, 125ac, 125ad, 125bc, 125bd, 125cd, 135a, and 135b. For example, the network interface circuit 204 can establish one or more of the communication links 125ab, 125ac, 125ad, 125bc, and 125bd with network interface circuits 204 of other roving cryptography devices 120 to relay data among the CN 101 and the user devices 130a and 130b in the manner described. The network interface circuit 204 can establish the communication link 115 with the network interface circuit 214 of the base station 110 to send data to and receive data from the CN 101 via the base station 110 (the communication link 115) in the manner described. The network interface circuit 204 can establish the communication link 135a or 135b (via for example suitable random access procedures) with the network interface circuit 224 of the user device 130 to send data to and receive data from the user device 130 in the manner described. Accordingly, the network interface circuit 204 includes any of a cellular transceiver (for cellular standards), wireless network transceiver (for 802.11X, Zig-Bee, Bluetooth, Wi-Fi, or the like), satellite communication transceiver (for satellite communication standards), or a combination thereof. For example, the network interface circuit 204 may include wireless network modems, ports, baseband processors, and associated software and firmware.

The locomotion system 205 includes any system configured for movement and propulsion. In the examples in which the roving cryptography device 120 includes a drone, UAV, UGV, UMV, airplanes, gliders, and so on, the locomotion system 205 includes motors, engines, tires, wheels, tracks, robotic legs or limbs, rotors, propellers, sails, and so on. In the examples in which the roving cryptography device 120 includes a satellite, the locomotion system 205 includes chemical propulsion systems, chemical thrusters, electric propulsion systems, rockets, and so on. In the examples in which the roving cryptography device 120 incudes HAPS, the locomotion system 205 includes motors, engines, rotors, propellers, and so on. The locomotion system 205 also includes fuel, battery, power supply, solar panels, etc. used to provide for energy needed to effectuate motion. The locomotion system 205 can be implemented using the processing circuit 201, which can control the movement, navigation, pathing, obstacle avoidance by controlling the locomotion system 205.

The cryptography service system 206 can provide cryptographic materials to the user device 130. The cryptography service system 206 can include a cryptographic material generator 207, a cryptographic material storage 208, and a cryptographic material delivery system 209.

The cryptographic material generator 207 is configured to generate a cryptographic material. In some examples, the cryptographic material generator 207 is configured to generate information (e.g., a secret parameter, a random number, a seed, a key component, an initialization vector, a salt, and so on) used to generate or derive a cryptographic key. For example, the cryptographic material generator 207 can include a random number generator, a pseudo-random number generator, or a Quantum Random Number Generator (QRNG) to generate a random number. For example, the QRNG can include a quantum entropy having a quantum entropy source to generate a stream of quantum particles (entangled or regular), such as photons containing information such as a string of binary zeroes and ones to be measured by an entropy measure function to generate random bits. In other words, the stream of quantum particles can be interpreted as a random number. In some examples, the cryptographic material generator 207 can implement a Key Derivation Function (KDF) to generate or derive a cryptographic key using the information (e.g., a secret parameter, a random number, a seed, a key component, an initialization vector, a salt, and so on).

The cryptographic material storage 208 includes any suitable memory device, database, datacenter, Key Management Infrastructure (KMI), HSM, and so on that can securely store sensitive information such as the cryptographic material.

The cryptographic material delivery system 209 is configured to deliver the cryptographic material stored in the cryptographic material storage 208 or generated by the cryptographic material generator 207 to one or more user devices 130. In some examples, the cryptographic material delivery system 209 can use the network interface circuit 204 to wirelessly transmit the cryptographic material via the communication links 135a and 135b (e.g., the same link through which the data encrypted, signed, or protected using the cryptographic material is communicated).

In some examples, the cryptographic material delivery system 209 can use the network interface circuit 204 to wirelessly transmit the cryptographic material via a communication link separate from the communication links 135a and 135b (e.g., separate from the link through which the data encrypted, signed, or protected using the cryptographic material is communicated). For instance, whereas the communication links 135a and 135b are cellular networks, WiFi networks, satellite communication networks, or non-radio frequency communication networks such as infrared networks, ultraviolet networks, laser networks, and so on, the network interface circuit 204 can establish a different type of wireless communication (e.g., blue-tooth or near field communication) with the network interface circuit 224 for transferring the cryptographic material. Given that blue-tooth and near field communication links are short-distance wireless protocols, the safety of such communication links may be superior in view of the unavailability of other security measures.

In some examples, cryptographic material delivery system 209 can include a physical cable or a wired connection (e.g., a Universal Serial Bus (USB) connector) through which the cryptographic material is transferred into the user device 130. A user of the user device 130 can physically connect (e.g., plug in) the physical cable into the user device 130 in order for the user device 130 to receive the cryptographic material. In some examples, the physical connection can be autonomous in-nature—an image-guided robotic manipulator including the physical cable can autonomously connect to a mating port on the user device 130.

In some examples, the roving cryptography device 120 has Store And Forward (SAF) capabilities. For example, the memory 203 can store a file (e.g., a Purchase Order (PO), an electronic legal document, code, application, and so on) to be signed. The network interface circuit 204 can receive such file wirelessly from another communication node (e.g., a base station, a user device, a satellite, HAPS, and so on). The file can be received wirelessly while the roving cryptography device 120 is at its base or charging platform, or enroute or along a path toward a user device 130. After establishing a connection with the user device 130, the network interface circuit 204 can transfer (e.g., send) wirelessly through the established communication link the file along with the cryptographic materials to be used to sign the file to the user device 130 (e.g., to the network interface circuit 224). In such examples, the roving cryptography device 120 may not connect to base station 110, the CN 101, or other roving cryptography devices. That is, the roving cryptography device 120 can provide the file and the cryptographic materials off-the-network, so that the signed file is physically moved by the roving cryptography device 120 until the roving cryptography device 120 uploads the file in the manner described. The application circuit 227 and the output device of the user device 130 can present the file for review and signature to the user. The user of the user device 130 can review, edit, and sign the file via input/output device. The electronic signature is generated using the cryptographic materials provided by the roving cryptography device 120 along with the file. The signed file is transferred (e.g., sent) by the network interface circuit 224 to the network interface circuit 204. The network interface circuit 204 can immediately or subsequently (e.g., upon returning or while returning to its base or charging platform) upload (e.g., send) the signed file via a suitable network to the system that provided the unsigned file or to another system. In some examples, the roving cryptography device 120 includes rechargeable energy sources such as solar panels to recharge its batteries, stands by in a lazy circle holding pattern until the user has reviewed, commented, or signed the file. In that regard, the roving cryptography device 120 carries the file and the cryptographic materials for the file to provide to the user device 130.

The base station 110 is shown to include various circuits and logic for implementing the operations described herein. More particularly, the base station 110 includes one or more of a processing circuit 211 and a network interface circuit 214. While various circuits, interfaces, and logic with particular functionality are shown, it should be understood that the base station 110 includes any number of circuits, interfaces, and logic for facilitating the operations described herein. For example, the activities of multiple circuits are combined as a single circuit and implemented on a same processing circuit (e.g., the processing circuit 211), as additional circuits with additional functionality are included.

In some arrangements, the processing circuit 211 has a processor 212 and memory 213. The processor 212 is a processing component such as the processor 202. The memory 213 is a memory device such as the memory 203. The processing circuit 211 can be used to implement the circuit 214.

The network interface circuit 214 is configured for and structured to establish and implement one or more of the communication links 105 and 115. For example, the network interface circuit 214 can establish the communication links 115 with network interface circuits 204 of the roving cryptography device 120a to relay data among the CN 101 and the user devices 130a and 130b in the manner described. The network interface circuit 214 can establish the communication link 105 (e.g., an Iu interface) with the CN 101. Accordingly, the network interface circuit 214 includes any of a cellular transceiver (for cellular standards), wireless network transceiver (for 802.11X, ZigBee, Bluetooth, Wi-Fi, or the like), wired network interface, or a combination thereof. For example, the network interface circuit 214 may include wireless network modems, ports, baseband processors, and associated software and firmware.

The user device 130 can include a suitable computing system such as a desktop computer, laptop computer, smart phone, tablet, server, on-premise computing system, datacenter, cloud computing system, and so on. The user device 130 is shown to include various circuits and logic for implementing the operations described herein. More particularly, the user device 130 includes one or more of a processing circuit 221, a network interface circuit 224, a cryptographic material receiving system 225, a cryptography circuit 226, and an application circuit 227. While various circuits, interfaces, and logic with particular functionality are shown, it should be understood that the user device 130 includes any number of circuits, interfaces, and logic for facilitating the operations described herein. For example, the activities of multiple circuits are combined as a single circuit and implemented on a same processing circuit (e.g., the processing circuit 221), as additional circuits with additional functionality are included.

In some arrangements, the processing circuit 221 has a processor 222 and memory 223. The processor 222 is a processing component such as the processor 202. The memory 223 is a memory device such as the memory 203. The processing circuit 221 can be used to implemented one or more of the circuits 224, 225, 226, and 227.

The network interface circuit 224 is configured for and structured to establish and implement one or more of the communication links 135a and 135b. For example, the network interface circuit 224 can establish the communication link 135a or 135b with network interface circuits 204 of the roving cryptography device 120 to relay data among the CN 101 and the user device 130 in the manner described. Accordingly, the network interface circuit 224 includes any of a cellular transceiver (for cellular standards), wireless network transceiver (for 802.11X, ZigBee, Bluetooth, Wi-Fi, or the like), satellite communication transceiver (for satellite communication standards), or a combination thereof. For example, the network interface circuit 224 may include wireless network modems, ports, baseband processors, and associated software and firmware.

The cryptographic material receiving system 225 is configured to receive the cryptographic material from a roving cryptography device 120. In some examples, the cryptographic material receiving system 225 can use the network interface circuit 224 to wirelessly receive the cryptographic material via the communication links 135a and 135b (e.g., the same link through which the data encrypted, signed, or protected using the cryptographic material is communicated).

In some examples, the cryptographic material receiving system 225 can use the network interface circuit 224 to wirelessly receive the cryptographic material via a communication link separate from the communication links 135*a* and 135*b* (e.g., separate from the link through which the data encrypted, signed, or protected using the cryptographic material is communicated). For instance, whereas the communication links 135*a* and 135*b* are cellular networks, WiFi networks, satellite communication networks, or non-radio frequency communication networks such as infrared networks, ultraviolet networks, laser networks, and so on the network interface circuit 224 can establish a different type of wireless communication (e.g., blue-tooth or near field communication) with the network interface circuit 204 for transferring the cryptographic material. Given that blue-tooth and near field communication links are short-distance wireless protocols, the safety of such communication links may be superior in view of the unavailability of other security measures.

In some examples, cryptographic material delivery receiving system 225 can include hardware (e.g., a mating port such as a USB port) through which the cryptographic material is transferred from the roving cryptography device 120. A user of the user device 130 can physically connect (e.g., plug in) the physical cable into a receptacle of the cryptographic material delivery receiving system 225 in order to receive the cryptographic material. In some examples, the physical connection can be autonomous in-nature—an image-guided robotic manipulator including the physical cable of the cryptographic material delivery system 209 can autonomously connect to a mating port of the cryptographic material delivery receiving system 225.

The cryptography circuit 226 is configured to perform cryptographic operations using the cryptographic materials received and can be considered as a cryptographic software module implemented using one or more of software, firmware, and hardware. In some examples, the cryptography circuit 226 can be included in or embodied as an HSM. For example, the HSM meets Federal Information Processing Standard (FIPS) 140-3 security level 3 or higher. In the examples in which the cryptography circuit 226 or the entire user device 130 is an HSM, the user device 130 can be physically connected to another device (e.g., a smartphone, a laptop, a tablet and so on), the roving cryptography device 120 can connect wirelessly and securely to the cryptography circuit 226 to exchange cryptographic materials (stored in the cryptographic material storage 208) or other encrypted data (stored in the memory 203). For example, the cryptography circuit 226 can perform, using the received cryptographic material, cryptographic operations such as encrypting data, decrypting data, encrypting another cryptographic material (e.g., another cryptographic key), decrypting another cryptographic material, signing data, verifying data, signcrypting data, and so on. In the examples in which the received cryptographic material includes a cryptographic key, the cryptography circuit 226 can use the cryptographic key directly for encrypting data, decrypting data, encrypting another cryptographic material (e.g., another cryptographic key), decrypting another cryptographic material, signing data, verifying data, signcrypting data, and so on. In the examples in which the received cryptographic material includes information that can be used to derive a cryptographic key, the cryptography circuit 226 can implement a KDF to generate or derive a cryptographic key using the information (e.g., a secret parameter, a random number, a seed, a key component, an initialization vector, a salt, and so on).

The application circuit 227 executes an application, software, firmware, or code for which cryptographic operations are needed to encrypt data, decrypt data, encrypt another cryptographic material, decrypt another cryptographic material, sign data, verify data, signcrypt data, and so on. For example, the application circuit 227 can execute a mobile banking application, mobile wallet, a browser, a word processing application, a mobile banking application, a mobile wallet, a Graphic User Interface (GUI), an email reader/client, a File Transfer Protocol (FTP) client, a virtual machine application and so on. For example, application circuit 227 can execute an application, software, firmware, or code for which data (e.g., message, code, document, file, program or application, etc.) needs to be encrypted, decrypted, signed, or for which a signature on the signed data needs to be verified.

In some examples, the cryptographic material generator 207 and the cryptographic material delivery system 209 can perform QKD to distribute cryptographic keys to two user devices 130 (e.g., at least one of which can include an HSM). For example, two user devices 130 can be within the cell of the roving cryptography device 120 and can receive wireless communication services via the network interface circuit 204 of the roving cryptography device 120. QKD is mechanism by which cryptographic keys are established between two communicating parties, such as the two user device 130. Example QKD protocols include the BB84 protocol and the E91 protocol.

In some examples, the cryptographic material generator 207 includes a QKD device (e.g., a quantum entropy source) that can generate two steams of quantum entangled particles, e.g., photons containing information such as a string of binary zeroes and ones corresponding to a random number. The cryptographic material delivery system 209 includes a first quantum communication channel that can send one stream to a first user device (e.g., a quantum particle reader thereof) and a second quantum communication channel that can send another stream to a second user device (e.g., a quantum particle reader thereof). The QKD device can be a true RNG that provides a quantum-safe random numbers that is unpredictable. Each stream of the quantum entangled particles includes same random bits, if untampered. The first quantum communication channel can be configured to be detachably coupled (via removable mechanical fasteners such as latches, buckles, anchors, rivets, clasp, clip, clutch, etc.) to a quantum particle reader of the cryptographic material receiving system 225 of the first user device. Prior to initiating QKD, the locomotion system 205 can move the first user device to a position that is sufficiently near the first user device to attach an end of the first quantum communication channel to the quantum particle reader of the first user device. For example, a first user or a vision-based robotic system of the cryptographic material delivery system 209 of the first user device can couple the end of the first quantum communication channel to the quantum particle reader of the first user device via the mechanical fastener. The second quantum communication channel can be configured to be detachably coupled (via removable mechanical fasteners such as latches, buckles, anchors, rivets, clasp, clip, clutch, etc.) to a quantum particle reader of the cryptographic material receiving system 225 of the second user device. Prior to initiating QKD, the locomotion system 205 can move the first user device to a position that is sufficiently near the second user device to attach an end of the second quantum communication channel to the quantum particle reader of the first second device. For example, a second user or a vision-based robotic system of the cryptographic material delivery system 209 of the second user device can couple the end of the second quantum communication channel to the quantum particle reader of the second user device via the mechanical fastener.

The quantum particle readers (e.g., entropy measure functions) of both user devices read the entangled particles, interpret the same string of binary zeroes and ones (e.g., the random number), and convert the random number into a cryptographic key using a KDF of the cryptography circuit 226. The first user device and the second user device can use a separate communication channel between the first user device and the second user device to statically verify that the first user device and the second user device have read and interpreted the entangled particle correctly, e.g., the cryptographic keys read by the first user device and the second user device are the same.

The first user device reading the entangled particles before the second user device reading the entangled participles destroys the entanglement given that although the devices reads the same information, the entangled particles are affected by the prior reading of the entangled particles. Thus, if another attempt is made by the first user device, the second user device, or an attacker to re-read the same stream, the affected particles become no longer entangled, resulting in a different interpretation. Further, an attacker reading a stream before the first user device breaks the entanglement such that when the first user device reads the stream, the reading by the first user device affects the particles, and the second user device will obtain an invalid interpretation. An attacker reading the stream after the first user device reads the stream also affects the detangled particles, and the second user device will obtain an invalid interpretation. QKD allows an attacker to be detected such that the first user device and the second user device have knowledge of the attack by detecting invalid interpretation, thus refraining from using the stream to establish a cryptographic key.

Accordingly, a two user devices can receive entangled particles whose entanglement can be collapsed to produce a mutually known number that can be used for encrypted communications between the two user devices. Rather than delivering the entangled particles via a traditional key loading device, the roving cryptography devices 120 can deliver the entangled particles to the two user devices (e.g., the user device 130a and 130b).

The users of the user devices 130 can include the unbanked, first responders, field researchers, and individuals whose access to applications executed by the application circuit 227 has been temporarily interrupted. As noted herein, many users of financial services or applications rely on mobile banking and other online access (e.g., for applications executed by the application circuit 227) but may find themselves unable to access any reliable network to conduct financial transactions. For example, a user with interrupted access or at a remote region may need to disperse emergency cash to a family member at an ATM halfway around the world. In another example, a user located offshore may need to execute a million dollar transfer for a time-sensitive transaction. In yet another example, a user located at a remote site may require access to online banking. In some arrangements, the system 100 provides secured access to online network services (e.g., financial banking) to users, temporarily or permanently without network access, by providing both communication services and cryptography services using a network of roving cryptography devices.

In some examples, the roving cryptography devices 120a, 120b, 120c, and 120d can be dispatched or instructed to move to their respective locations to form the network based on a schedule. That is, each of the roving cryptography devices 120a, 120b, 120c, and 120d can be moved using their respective locomotion systems 205 to a designated location periodically (every day, every week, every month, and so on) or according to a scheduled time. The schedule can include at least one designated location for each of the roving cryptography devices 120a, 120b, 120c, and 120d and a corresponding time for each of the at least one designated location. In response to the server determining that it is the time to move to the locations according to the schedule, the server sends a command to each of the roving cryptography devices 120a, 120b, 120c, and 120d with their respective locations to trigger the deployment. In the examples in which the schedule is provided to the roving cryptography devices 120a, 120b, 120c, and 120d in advance, in response to each of the roving cryptography devices 120a, 120b, 120c, and 120d determining that it is the time to move to a respective location (defined by suitable coordinates such as Global Positioning System (GPS) coordinates), each of the roving cryptography devices 120a, 120b, 120c, and 120d moves to that respective location using suitable navigation system and propulsion system in the locomotion system 205. A server for managing the roving cryptography devices 120a, 120b, 120c, and 120d, which includes suitable processing capabilities (e.g., at least one processor and at least one memory), can be configured to pre-load, update, or dynamically send the schedule and the corresponding coordinates for each of the roving cryptography devices 120a, 120b, 120c, and 120d via one or more suitable networks. The locations for some of the roving cryptography devices 120a, 120b, 120c, and 120d are intended to cover the user devices, while the locations of other the rest of the roving cryptography devices 120a, 120b, 120c, and 120d can form a path to a closest base station 110.

In some examples, the schedule of one or more of the roving cryptography devices 120a, 120b, 120c, and 120d can correspond to a predetermined path of the one or more of the roving cryptography devices 120a, 120b, 120c, and 120d. In the example in which a roving cryptography device is a satellite with a predetermined path (e.g., orbit) passing over various locations on the earth surface, the times by which the satellite pass over certain locations (defined by sets of coordinates) correspond to the schedule. In other words, the schedule can be implicit and is continuously implemented. The cell of the satellite can continue to change according to the predetermined path, and the satellite can provide communication services and cryptography services for a user device when and while the user device is within a cell corresponding to a current location of the satellite.

In some examples, the roving cryptography devices 120a, 120b, 120c, and 120d can be dispatched or instructed to move to their respective locations to form the network in response to detecting an adverse event. The server for managing the roving cryptography devices 120a, 120b, 120c, and 120d can receive information regarding the adverse event such as a location or area of the adverse event as defined by a set of coordinates (e.g., GPS coordinates) and assigns the respective locations of the roving cryptography devices 120a, 120b, 120c, and 120d to cover the location or area of the adverse event. In response to each of the roving cryptography devices 120a, 120b, 120c, and 120d receiving a respective coordinate for a location within or next to an area of the adverse event, each of the roving cryptography devices 120a, 120b, 120c, and 120d moves to that respective location using suitable navigation system and propulsion system in the locomotion system 205. The locations for some of the roving cryptography devices 120*a*, 120*b*, 120*c*, and 120*d* are intended to cover the user devices within the adverse event, while the locations of other the rest of the roving cryptography devices 120*a*, 120*b*, 120*c*, and 120*d* can form a path to a closest base station 110.

In some examples, the roving cryptography devices 120*a*, 120*b*, 120*c*, and 120*d* can be dispatched or instructed to move to their respective locations to form the network based on a location of a user device 130. The user device 130 can include a geolocation circuit (e.g., a GPS system) configured to determine a location of the user device 130. The server for managing the roving cryptography devices 120*a*, 120*b*, 120*c*, and 120*d* can monitor a location of the user device 130. In response to determining that a location of the user device 130 is within a predetermined area or is at a predetermined location, the server instructs at least one of the roving cryptography devices 120*a*, 120*b*, 120*c*, and 120*d* to provide cell coverage for the communication services and cryptography services in the manner described herein. The rest of the roving cryptography devices 120*a*, 120*b*, 120*c*, and 120*d* can form a path to a closest base station 110. The predetermined area or location can correspond to an area with poor communication services, crossing a border (e.g., currency exchange using a mobile application may be needed), and so on.

Figures 3, 4:
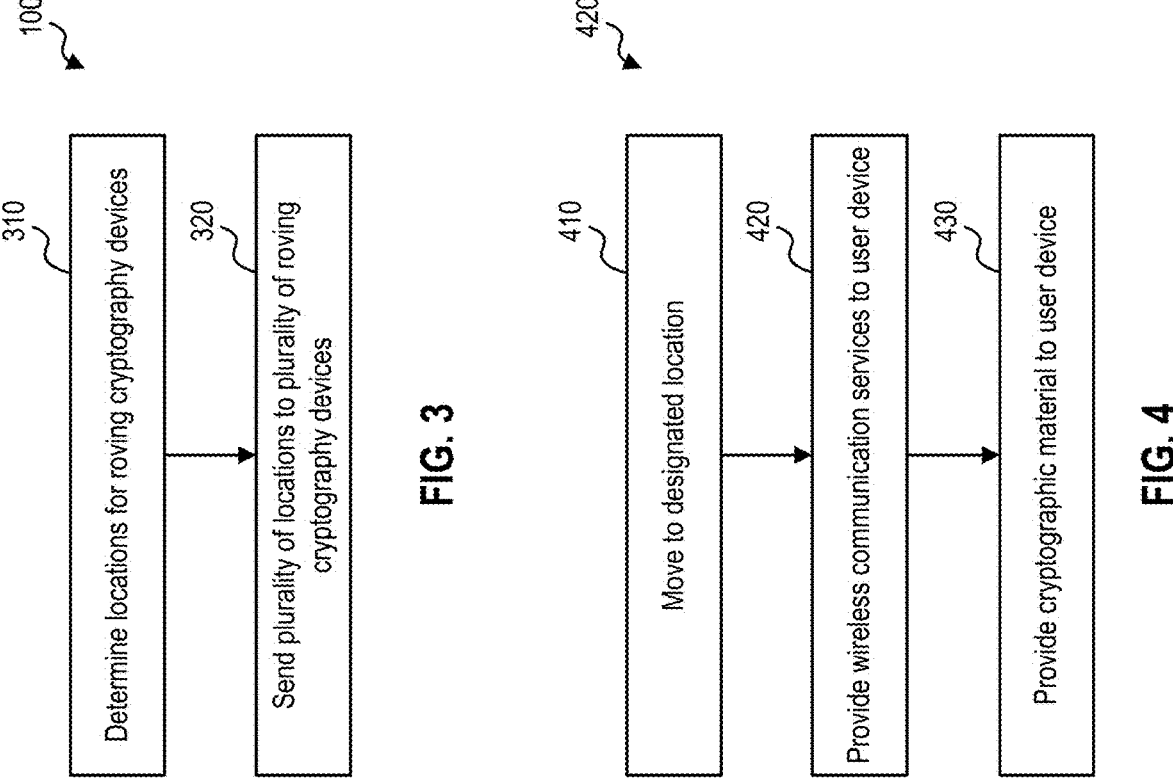
FIG. 3 is a flowchart diagram illustrating an example method for deploying a roving system, according to various arrangements.
FIG. 4 is a flowchart diagram illustrating an example method for a roving cryptography device to provide communication services and cryptography services, according to various arrangements.

FIG. 3 is a flowchart diagram illustrating an example method 300 for deploying the roving system 100, according to various arrangements. The method 300 can be performed by a server with at least one processor and at least one memory. At 310, the server (e.g., at least one processor thereof) determines a plurality of locations for a plurality of roving cryptography devices (e.g., the roving cryptography devices 120*a*, 120*b*, 120*c*, and 120*d*). The locations can be determined according to a schedule, according to a predetermined path (e.g., orbit), or according to a location of the user device. At 320, the server (e.g., at least one processor thereof) sends the plurality of locations to the plurality of roving cryptography devices via a suitable network.

FIG. 4 is a flowchart diagram illustrating an example method 400 for a roving cryptography device 120 to provide communication services and cryptography services, according to various arrangements. At 410, the locomotion system 205 moves the roving cryptography device 120 to a respective one of a plurality of locations of the plurality of roving cryptography devices. At 420, the network interface circuit 204 provides wireless communication services to a user device 130 of a plurality of user devices through a network of the plurality of roving cryptography devices. At 430, a cryptography service system 206 provide cryptographic material to the user device 130. The plurality of roving cryptography devices at the plurality of locations form the network for providing the wireless communication services and the cryptographic materials to the plurality of user devices.

In some examples, the user device 130 uses the cryptographic material to perform at least one of encrypting data, decrypting data, encrypting another cryptographic material, decrypting another cryptographic material, signing data, verifying data, or signcrypting data. In some examples, at least one of the encrypted data, the data to be encrypted, the decrypted data, the data to be decrypted, the encrypted another cryptographic material, the another cryptographic material to be encrypted, the decrypted another cryptographic material, the another cryptographic material to be decrypted, the signed data, the data to be signed, the verified data, or the data to be verified is sent or received by the network interface circuit 224 of the user device 130 using the wireless communication services. The data can include sensitive information such as passwords, Personal Identification Number (PIN), Personal Identification Information (PII), and so on.

In some examples, the plurality of user devices includes a first user device and a second user device. The cryptography service system includes a QKD device, a first quantum communication channel configured to be removably coupled to the first user device, and a second quantum communication channel configured to be removably coupled to the second user device. In some examples, the QKD device is configured to provide a first stream of quantum particles to the first user device via the first quantum communication channel. The QKD device is configured to provide a second stream of quantum particles to the second user device via the second quantum communication channel. The first stream of quantum particles and the second stream of quantum particles are entangled.

In some examples, providing the wireless communication services to the user device through the network includes receiving, by the network interface circuit of a first roving cryptography device of the plurality of roving cryptography devices, data from the user device, forwarding, by the network interface circuit of the first roving cryptography device to a network interface circuit of a second roving cryptography device of the plurality of roving cryptography devices or to a network interface circuit 214 of a base station 110, the data, wherein the base station 110 is configured to send the data to the CN 101.

In some examples, providing the wireless communication services to the user device through the network includes receiving, by the network interface circuit of a first roving cryptography device of the plurality of roving cryptography devices, data from a first user device of the plurality of user devices and forwarding, by the network interface circuit 204 of the first roving cryptography device to a network interface circuit 204 of a second roving cryptography device of the plurality of roving cryptography devices, the data, directly or via at least one third roving cryptography device of the plurality of roving cryptography devices. The network interface circuit of the second roving cryptography device is configured to send the data to a second user device of the plurality of user devices.

In some examples, providing the wireless communication services to the user device through the network includes receiving, by the network interface circuit 204 of a first roving cryptography device of the plurality of roving cryptography devices from a network interface circuit 204 of a second roving cryptography device of the plurality of roving cryptography devices or from a network interface circuit 214 of a base station 110, data intended for the user device. The base station 110 is configured to receive the data from a core network. The network interface circuit 204 of the first roving cryptography device sends the data to the user device 130.

In some examples, providing the wireless communication services to the user device through the network includes receiving, by the network interface circuit 204 of a first roving cryptography device of the plurality of roving cryptography devices from a network interface circuit 204 of a second roving cryptography device of the plurality of roving cryptography devices, data intended for a first user device of the plurality of user devices. The second roving cryptography device is configured to receive, directly or via at least one third roving cryptography device of the plurality of roving cryptography devices, the data from a second user device of the plurality of user devices. The network interface circuit 204 of the first roving cryptography device sends the data to the user device 130.

In some examples, providing the cryptographic material to the user device includes configuring the network interface circuit 204 to send the cryptographic material to the user device 130. In some examples, the wireless communication services are provided to the user device 130 via a first communication channel. The cryptographic material is provided to the user device 130 via a second communication channel. The first communication channel and the second communication channel are different. In some examples, the cryptography service system 206 (e.g., the cryptographic material delivery system 209) includes a cable or a wired connection through which the cryptographic material is provided to the user device 130.

In some examples, the user device 130 uses the cryptographic material to perform at least one of encrypting data, decrypting data, encrypting another cryptographic material, decrypting another cryptographic material, signing data, verifying data, or signcrypting data. In some examples, at least one of the encrypted data, the data to be encrypted, the decrypted data, the data to be decrypted, the encrypted another cryptographic material, the another cryptographic material to be encrypted, the decrypted another cryptographic material, the another cryptographic material to be decrypted, the signed data, the data to be signed, the verified data, or the data to be verified is sent or received by the network interface circuit 224 of the user device 130 using the wireless communication services. The data can include sensitive information such as passwords, Personal Identification Number (PIN), Personal Identification Information (PII), and so on.

As utilized herein, the terms "approximately," "substantially," and similar terms are intended to have a broad meaning in harmony with the common and accepted usage by those of ordinary skill in the art to which the subject matter of this disclosure pertains. It should be understood by those of ordinary skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

Although only a few arrangements have been described in detail in this disclosure, those skilled in the art who review this disclosure will readily appreciate that many modifications are possible (e.g., variations in sizes, dimensions, structures, shapes, and proportions of the various elements, values of parameters, mounting arrangements, use of materials, colors, orientations, etc.) without materially departing from the novel teachings and advantages of the subject matter described herein. For example, elements shown as integrally formed may be constructed of multiple components or elements, the position of elements may be reversed or otherwise varied, and the nature or number of discrete elements or positions may be altered or varied. The order or sequence of any method processes may be varied or re-sequenced according to alternative arrangements. Other substitutions, modifications, changes, and omissions may also be made in the design, operating conditions and arrangement of the various exemplary arrangements without departing from the scope of the present disclosure.

The arrangements described herein have been described with reference to drawings. The drawings illustrate certain details of specific arrangements that implement the systems, methods and programs described herein. However, describing the arrangements with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some arrangements, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some arrangements, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some arrangements, the one or more processors may be embodied in various ways. The one or more processors may be constructed in a manner sufficient to perform at least the operations described herein. In some arrangements, the one or more processors may be shared by multiple circuits (e.g., circuit A and circuit B may include or otherwise share the same processor which, in some example arrangements, may execute instructions stored, or otherwise accessed, via different areas of memory). Alternatively or additionally, the one or more processors may be structured to perform or otherwise execute certain operations independent of one or more co-processors. In other example arrangements, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some arrangements, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the arrangements might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), a distributed ledger (e.g., a blockchain), etc. In some arrangements, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other arrangements, the volatile storage media may take the form of RAM, TRAM, ZRAM, etc. Combinations of the above are also included within the scope of machine-readable media. In this regard, machine-executable instructions include, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example arrangements described herein.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative arrangements. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web arrangements of the present disclosure could be accomplished with standard programming techniques with rule based logic and other logic to accomplish the various database searching steps, correlation steps, comparison steps and decision steps.

The foregoing description of arrangements has been presented for purposes of illustration and description. It is not intended to be exhaustive or to limit the disclosure to the precise form disclosed, and modifications and variations are possible in light of the above teachings or may be acquired from this disclosure. The arrangements were chosen and described in order to explain the principals of the disclosure and its practical application to enable one skilled in the art to utilize the various arrangements and with various modifications as are suited to the particular use contemplated. Other substitutions, modifications, changes and omissions may be made in the design, operating conditions and arrangement of the arrangements without departing from the scope of the present disclosure as expressed in the appended claims.

What is claimed is:

1. A system, comprising:
   a plurality of roving cryptography devices, wherein each of the plurality of roving cryptography devices comprises:
      a locomotion system configured to move each of the plurality of roving cryptography devices to a respective one of a plurality of locations of the plurality of roving cryptography devices;
      a network interface circuit configured to provide wireless communication services by sending or receiving data wirelessly to a user device of a plurality of user devices through a network of the plurality of roving cryptography devices; and
      a cryptography service system configured to provide cryptographic material to the user device, the cryptographic material is used to perform cryptographic operation on the data, wherein the plurality of roving cryptography devices at the plurality of locations form the network for providing the wireless communication services and the cryptographic materials to the plurality of user devices, wherein the cryptographic material comprises a cryptographic key, authentication code, or certificate.

2. The system of claim 1, wherein each of the plurality of roving cryptography devices comprises a drone, an Unmanned Ariel Vehicle (UAV), an Unmanned Ground Vehicle (UGV), an Unmanned Maritime Vehicle (UMV), airplanes, gliders, a satellite, or a High Altitude Platform System (HAPS).

3. The system of claim 1, wherein
   the plurality of user devices comprises a first user device and a second user device;
   the cryptography service system comprises a Quantum Key Distribution (QKD) device, a first quantum communication channel configured to be removably coupled to the first user device, and a second quantum communication channel configured to be removably coupled to the second user device.

4. The system of claim 3, wherein
   the QKD device is configured to provide a first stream of quantum particles to the first user device via the first quantum communication channel;
   the QKD device is configured to provide a second stream of quantum particles to the second user device via the second quantum communication channel;
   the first stream of quantum particles and the second stream of quantum particles are entangled; and
   the first user device comprises a Hardware Security Module (HSM).

5. The system of claim 1, wherein providing the wireless communication services to the user device through the network comprises:
   receiving, by the network interface circuit of a first roving cryptography device of the plurality of roving cryptography devices, data from the user device; and
   forwarding, by the network interface circuit of the first roving cryptography device to a network interface circuit of a second roving cryptography device of the plurality of roving cryptography devices or to a network interface circuit of a base station, the data, wherein the base station is configured to send the data to a core network.

6. The system of claim 1, wherein providing the wireless communication services to the user device through the network comprises:

receiving, by the network interface circuit of a first roving cryptography device of the plurality of roving cryptography devices, data from a first user device of the plurality of user devices; and forwarding, by the network interface circuit of the first roving cryptography device to a network interface circuit of a second roving cryptography device of the plurality of roving cryptography devices, the data, directly or via at least one third roving cryptography device of the plurality of roving cryptography devices, wherein the network interface circuit of the second roving cryptography device is configured to send the data to a second user device of the plurality of user devices.

7. The system of claim 1, wherein providing the wireless communication services to the user device through the network comprises:

receiving, by the network interface circuit of a first roving cryptography device of the plurality of roving cryptography devices from a network interface circuit of a second roving cryptography device of the plurality of roving cryptography devices or from a network interface circuit of a base station, data intended for the user device, wherein the base station is configured to receive the data from a core network; and sending, by the network interface circuit of the first roving cryptography device, the data to the user device.

8. The system of claim 1, wherein providing the wireless communication services to the user device through the network comprises:

receiving, by the network interface circuit of a first roving cryptography device of the plurality of roving cryptography devices from a network interface circuit of a second roving cryptography device of the plurality of roving cryptography devices, data intended for a first user device of the plurality of user devices, wherein the second roving cryptography device is configured to receive, directly or via at least one third roving cryptography device of the plurality of roving cryptography devices, the data from a second user device of the plurality of user devices; and sending, by the network interface circuit of the first roving cryptography device, the data to the first user device.

9. The system of claim 1, wherein providing the cryptographic material to the user device comprises configuring the network interface circuit to send the cryptographic material to the user device.

10. The system of claim 9, wherein the wireless communication services are provided to the user device via a first communication channel; and the cryptographic material is provided to the user device via a second communication channel; and the first communication channel and the second communication channel are different.

11. The system of claim 1, wherein the cryptography service system comprises a cable or a wired connection through which the cryptographic material is provided to the user device.

12. The system of claim 1, wherein each of the plurality of roving cryptography devices further comprises:

a memory device configured to store a file to be signed; wherein the network interface circuit configured to:

send the file to be signed to the user device through the network, wherein the cryptographic material is used by the user device to sign the file to be signed; and receive the signed file from the user device.

13. A roving cryptography device, comprises:

a locomotion system configured to move the roving cryptography device to a locations;

a network interface circuit configured to provide wireless communication services by sending or receiving data wirelessly to a user device through a network of a plurality of roving cryptography devices that comprises the roving cryptography devices; and a cryptography service system configured to provide cryptographic material to the user device, the cryptographic material is used to perform cryptographic operation on the data, wherein the user device uses the cryptographic material to perform at least one of encrypting data, decrypting data, encrypting another cryptographic material, decrypting another cryptographic material, signing data, verifying data, or signcrypting data, and wherein at least one of the encrypted data, the data to be encrypted, the decrypted data, the data to be decrypted, the encrypted another cryptographic material, the another cryptographic material to be encrypted, the decrypted another cryptographic material, the another cryptographic material to be decrypted, the signed data, the data to be signed, the verified data, or the data to be verified is sent or received by the network interface circuit using the wireless communication services, wherein the cryptographic material comprises a cryptographic key, authentication code, or certificate.

14. The roving cryptography device of claim 13, wherein the roving cryptography device comprises a drone, an Unmanned Ariel Vehicle (UAV), an Unmanned Ground Vehicle (UGV), an Unmanned Maritime Vehicle (UMV), airplanes, gliders, a satellite, or a High Altitude Platform System (HAPS).

15. The roving cryptography device of claim 13, wherein the user device comprises a first user device and a second user device;

the cryptography service system comprises a Quantum Key Distribution (QKD) device, a first quantum communication channel configured to be removably coupled to the first user device, and a second quantum communication channel configured to be removably coupled to the second user device.

16. The roving cryptography device of claim 15, wherein the QKD device is configured to provide a first stream of quantum particles to the first user device via the first quantum communication channel;

the QKD device is configured to provide a second stream of quantum particles to the second user device via the second quantum communication channel;

the first stream of quantum particles and the second stream of quantum particles are entangled and the first user device comprises a Hardware Security Module (HSM).

17. A method, comprising:

determining, a plurality of locations for a plurality of roving cryptography devices, wherein each of the plurality of roving cryptography devices comprises:

a locomotion system configured to move each of the plurality of roving cryptography devices to a respective one of the plurality of locations of the plurality of roving cryptography devices;

a network interface circuit configured to provide wireless communication services by sending or receiving data wirelessly to a user device of a plurality of user devices through a network; and a cryptography service system configured to provide cryptographic material to the user device, the cryptographic material is used to perform cryptographic operation on the data, wherein the plurality of roving cryptography devices at the plurality of locations form the network for providing the wireless communication services and the cryptographic materials to the plurality of user devices; and sending the plurality of locations to the plurality of roving cryptography devices, wherein the cryptographic material comprises a cryptographic key, authentication code, or certificate.

18. The method of claim 17, wherein the cryptographic material comprises a cryptographic key, information used to generate or derive a cryptographic key, authentication code, or certificate.

* * * * *